ated Jan. 8, 1974

3,784,710
READY-TO-USE BATTER PRODUCT
Roland D. Earle, 749 N. Southlake Drive, and Morton S. Baum, 1131 Washington St., both of Hollywood, Fla. 33020
No Drawing. Filed Oct. 28, 1971, Ser. No. 193,586
Int. Cl. A21d 13/08
U.S. Cl. 426—128
19 Claims

ABSTRACT OF THE DISCLOSURE

A liquid, ready-to-use batter mixture which is stable chemically and bacteriologically. In addition to conventional batter components such as flour, water, shortening and flavoring, the batters of this invention contain effective amounts of ethyl alcohol to prohibit bacterial growth in the mixture at room temperature. The amounts of ethyl alcohol are also effective to prevent an increase of viscosity of the mixture by controlling the swelling of the flour by the water. The batter also contains effective amounts of heat coagulatable binding agent having the capability of forming a texture around the flour upon the application of heat to the batter.

BACKGROUND OF THE INVENTION

This invention relates to a liquid, ready-to-use batter mixture which may be packaged as a convenience food product. Such convenience food products are known. For example, U.S. Pat. 3,222,189 describes a "complete" dough or batter product claimed to have extended shelf stability under ambient conditions. These batters include water washed gluten and/or wheat starch or a water washed reconstituted wheat flour in combination with a quantity of ethyl alcohol and water. The patentee states that the use of ethyl alcohol substantially in excess of 5% based upon the total product tends to produce a gradual diminution of product quality. Although the patentee refers to a batter composition and claims same within the context of the disclosure, it is noted that these compositions are not smooth-flowing mixtures usable as pancakes, waffles or crepes. That is, the batter products of this patent have a thick viscosity which makes them unsuitable for the formation of products as produced in the instant invention.

U.S. Pat. 2,849,323 is directed to a disclosure of self-propelling food mixtures. The patentees indicate that cake batters and pancake batters may be dispensable in an aerosol container. No specific formulation is taught. However, the patentee teaches that foods not aerosol-dispensable in their normal state can be suitably modified using techniques known in the prior art. As shall appear more fully hereinafter, various modifications of batters taught in U.S. Pat. 3,222,189 do not produce an acceptable aerosol-dispensable batter.

There are other disadvantage associated with all other prior art batters. In actual practice, it has been found that alcohol in amounts used by the prior art is not effective to inhibit bacterial growth in a smooth-flowing mixture at room temperature. When effective amounts of flour, water and shortening are mixed to form a smooth-flowing consistency usable as pancakes, waffles or crepes, there is a problem associated with the increase of viscosity. That is, the water in the mixture causes the flour to swell and the resultant effect is to greatly increase the viscosity of the mixture. Herein lies a difficult problem in the prior art associated with such smooth-flowing mixtures.

The developing of a texture in the cooked product is also very difficult following prior art teachings. That is, cooked prior art batters very often have very gooey or sticky characteristics. This is opposed to the desired fluffy and light characteristics of good products such as pancakes and waffles.

Although the concept of having aerosol-dispensable pancake batters and cake batters is known, such mixtures produced as convenience foods have been heretofore unavailable. Problems such as swelling of the flour, leavening agents, settling problems and the like are present in the prior art mixtures. Until now, the specific problems have not been recognized nor have they been overcome. It is now possible for the first time to provide an aerosol-dispensable food product as a convenience food item.

PURPOSE OF THE INVENTION

The primary object of this invention is to provide a liquid, ready-to-use batter mixture which may be cooked to form pancakes, waffles or crepes after having been stored at room temperature.

Another object of this invention is to provide a food convenience product having a batter disposed in a container that is impervious to alcohol vapor wherein sufficient amounts of ethyl alcohol are present to inhibit bacterial growth in the mixture at room temperature so that the mixture is suitable for human consumption.

A further object of the invention is to provide a ready-to-use batter including effective amounts of flour, water, shortening and ethyl alcohol wherein the ethyl alcohol is present in amounts sufficient to prevent an increase of viscosity of the mixture by controlling the swelling of the flour by the water.

A further object of this invention is to provide a composition including heat coagulatable binding agent which has the capability of forming a texture around the flour when the mixture is heated for cooking.

A still further object of this invention is to provide a balanced ready-to-use batter which is capable of being dispensed from a container by a gas propellant.

Another object of the invention is to provide specific types of leavening agents for use in combination with a smooth-flowing batter mixture as disclosed herein.

SUMMARY OF THE INVENTION

These objects and other advantages may be accomplished through the use of the liquid, ready-to-use batter mixture of this invention. Sufficient amounts of ethyl alcohol are present in a smooth-flowing mixture of flour, water and shortening to overcome two problems. First, the ethyl alcohol must be present in sufficient amounts to inhibit bacterial growth in the mixture at room temperature so that the mixture is suitable for human consumption after extended storage times. Second, the ethyl alcohol must be present in amounts effective to prevent an increase of viscosity of the mixture by controlling the swelling of the flour by the water in the smooth-flowing mixture. It has been discovered that in this type of smooth-flowing mixture usable as pancakes, waffles or crepes, that the ethyl alcohol must be present in amounts of at least about 10% by weight to accomplish the desired results.

It has been discovered that effective amounts of heat coagulatable binding agents such as egg albumen, egg yolk and mixtures thereof enhance the cooked characteristics of the smooth-flowing batter mixtures. The binding agent must be present in an amount of at least about 3% by weight in order to form a texture around the flour when the batter mixture is cooked by heat on a griddle or the like. It has been discovered that when heat coagulatable binding agents of the present invention are used in combination with alcohol that difficulties result. It has been found that alcohol tends to establish a condition within the batter mixture wherein the binding agent such as albumen will not solublize. That is, too much alcohol prevents the binding agent such as albumen from forming a colloidal solution. I have found that amounts of ethyl alcohol must be limited to prevent the precipitation of the heat coagulatable binding agent within the liquid batter mixture. Therefore, when such a binding agent and alcohol are present together in the batter mixture, the alcohol must be present in a range of from about 10% to 20% by weight.

The batter mixtures of this invention must maintain their smooth-flowing characteristics to be packaged in an aerosol dispensing container over an extended period of time. It has been discovered that effective amounts of hydrocolloids such as carageenan must be present in the mixture to prevent settling of the solid material.

The batters of this invention have a lower viscosity because they contain more water than previously available complete batter mixes of the prior art. Despite the presence of additional water, the batters nevertheless will not grow bacteria at room temperature. Furthermore, they do not deteriorate enzymatically or chemically over extended periods of time. The viscosity of the mixture is sufficiently fluid for practical use to prepare pancakes, waffles or crepes in surprisingly short cooking time. A highly desirable, light, sponge-like structure results when the batter mixtures of this invention are cooked for one minute or less on each side.

The packaging of such liquid batter mixes has also been a problem with respect to the presence of leavening agents in the mixture. Leavening agents provide carbon dioxide or other equivalent gases to give the cooked pancake or waffle a very light and fluffy consistency. It has been found that the mixtures of this invention may be dispensed from a container including a propellant gas and a whipping gas. The whipping gas such as nitrous oxide provides a foamy consistency to the batter mix when propelled from the container. The batter mixes of this invention are also adaptable to storage in large containers from which the batter may be dipped or poured from a spigot. In this instance, the use of an encapsulated baking powder in combination with the other constituents including ethyl alcohol and binding agents will produce a desirable result. The use of such a combination has heretofore been unknown in the prior art. Through the use of encapsulated baking powder, it is possible to place the batter mixture of this invention in a container for subsequent dispensing by a propellent gas alone. The leavening action of the encapsulated baking powder takes place when the batter is poured onto a heated surface.

DESCRIPTION OF SPECIFIC EMBODIMENTS

The batters of this invention are prepared from well-known ingredients conventionally employed in batter preparations. The ingredients necessarily include flour, shortening and water to form a smooth-flowing mixture usable as pancakes, waffles or crepes. All kinds of flavorings and seasonings may be used which will not alter the basic characteristics of the smooth-flowing batter mixture of this invention. Various types of mixtures may be used to form German pancakes, dietetic pancakes, high protein pancakes, potato pancakes and the like. Any other type of flavoring and sweetening agents may be also used. Seasonings such as salt may be included with the mixture to obtain the desired taste. Milk is also a source for water and nutrient value.

The type of flour employed is not critical and encompasses a wide variety of flours comprising vital gluten and/or starch. The gluten or starch may or may not be reblended to provide a reconstituted or synthetic flour. Exemplary are bread flour, buckwheat flour, cake flour, corn flour, graham, entire wheat and whole wheat flours, gluten flour, oat flour, pastry or soft wheat flour, potato flour, rice flour, rye flour and others as more fully described in M. Given's "Modern Encyclopedia of Cooking" published by J. G. Ferguson & Associates, Chicago, 1953 (pp. 199–201). Mixtures of any of the foregoing flours can also be employed in the batter mixtures of this invention.

The leavening agents used herein encompass any agent that causes the batter to rise when it is placed upon a heated cooking surface. The leavening agent must produce steam, air or any other type of gas so that it is present within the mixture during cooking. Carbon dioxide may be derived from baking powders, baking soda and cream of tartar. In the mixture of this invention, there is a considerable amount of water present and the mixture is stored at room temperature over an extended period of time. These factors contribute to a general breakdown of the leavening agents over an extended period of time. Consequently the effects of the carbon dioxide may be dissipated. This specific problem has been overcome through the use of encapsulated baking powders which maintain their effectiveness in water. Wax materials are used to encapsulate the baking powder. The wax protects the baking powder from reacting with the water while the batter mixture is in storage. As soon as the batter mixture is placed on a cooking surface, heat will break down the wax encapsulation and the baking powder will perform its leavening action.

In the case of an aerosol dispensed formulation of this invention, the propellant gas can also act as a leavening agent. Exemplary of such propellants are those set forth in U.S. Pat. No. 2,849,323. More specifically, however, it has been found that a mixture of carbon dioxide used as a propellant gas and nitrous oxide used as a whipping gas will produce an extremely desirable result. The nitrous oxide will cause the smooth-flowing mixtures to contain the gas as it is propelled out of the alcohol impervious container. In those instances where it is desired to use only a propellant gas such as Freon by itself within an alcohol impervious container, the use of encapsulated leavening agents such as encapsulated baking powder is extremely desirable. The combinations of leavening agents as discussed hereinabove and the alcohol containing mixture effects results which have heretofore been unknown in the prior art.

The quantity of ethyl alcohol employed in the batter mixes of this invention must be sufficient to inhibit the bacterial growth in the mixture at room temperature so that the mixture is suitable for human consumption. That is, the batter mixes must constitute a bacteriologically stable formulation. It has been found that this result requires an amount of alcohol substantially in excess of 5% by weight of the total batter formulation. More specifically, it has been found that the ethyl alcohol should be present in amounts of at least about 10% by weight to attain the desired bacteriological stability.

Comparative analyses have been made with formulations in accordance with this invention and those formulations disclosed by the patentee in Pat. No. 3,222,189. It has been found that ethyl alcohol in amounts of about 5% are unsatisfactory when used in the smooth-flowing mixtures of this invention. Furthermore, the "batter" mixtures of the Pat. 3,222,189 were extremely heavy with a high viscosity. Therefore, the effectiveness of 5% of alcohol in controlling the viscosity of the mixture is questionable.

In some instance, larger quantities of alcohol may be employed. However, it has been found that when alcohol is used in combination with heat coagulatable binding agents such as egg albumen, egg yolk and mixtures thereof, that there is a tendency for these binding agents not to solubilize. Too much alcohol will prevent the albumen from dispersing throughout the mixture or forming a colloidal solution. That is, too much alcohol added to the batter mix will cause the precipitation of the heat coagulatable binding agent. It has been found that the ethyl alcohol present in the batter mixtures of this invention should not substantially exceed about 20% by weight of the total formulation. Amounts in excess of this quantity of ethyl alcohol will cause the heat coagulatable binding agent to precipitate. The lower limits of the ethyl alcohol quantities are established by the ethyl alcohol's effectiveness as discussed hereinabove. So long as the quantity of alcohol in the total formulation substantially exceeds 5% of the total weight, the unexpected results will occur in conjunction with the smooth-flowing batter mixtures of this invention. More specifically, it is found that the ethyl alcohol present in a range of from about 10% to 20% by weight achieves the results in batter mixtures used for pancakes, waffles or crepes heretofore not accomplished in the prior art.

A more specific feature of the invention is directed to the convenience food product wherein a batter mixture is disposed in a container impervious to alcohol vapors. More specifically, the batter mixture of this invention is placed in a container containing a gas propellant material. The container is well known in the art as an aerosol dispensing container. A primary problem associated with liquid batter mixes of the type used for pancakes, waffles and crepes is that the solid materials therein tend to settle over the long extended periods in which the mixtures may be placed on the shelf. The long extended periods are permitted by this invention due to the presence of ethyl alcohol in amounts substantially exceeding 5% by weight. It has been found that it is necessary to add effective amounts of hydrocolloids such as carageenan to prevent the settling of the solid material in the liquid batter mixture. The use of the protective hydrocolloid is absolutely necessary to form the convenience food product which includes a gas propellant within a container.

The effectiveness of the use of alcohol in accordance with this invention to produce a bacteriologically stable batter product is demonstrated by the following examples. In these and the following examples, all percentages are by weight.

EXAMPLE I

The pancake batter was prepared in accordance with the following formulation using whole eggs and additional powdered yolk material as the binding agent. The whole eggs and powdered egg yolks are heat coagulatable proteins.

| | Grams |
|---|---|
| Pillsbury's all purpose flour (wheat) | 200 |
| Dextrose | 40 |
| Bud 26 powdered whole eggs | 30 |
| Powdered egg yolks | 10 |
| Carageenan (Gelcarin H-WG) | 3 |
| Crisco | 40 |
| Vanilla extract | 2.5 |
| H$_2$O | 150 |
| 100 proof alcohol | 150 |

The above formulation was used to produce both acceptable pancakes and acceptable waffles. The pancake was made by placing the batter for a period of about one to one and a quarter minutes on each side at 380° F. A satisfactory waffle was produced by placing the formulation in a waffle iron for a period of about one minute.

EXAMPLE II

A liquid ready-to-use batter was prepared in accordance with the following formulation using only powdered whole eggs as the binding agent without the additional inclusion of powdered yolks.

| | Grams |
|---|---|
| Pillsbury's all purpose flour (wheat) | 200 |
| Dextrose | 40 |
| Powdered whole eggs (Marshall's E-Z-Egg) | 40 |
| Carageenan (Gelcarin H-WG) | 3 |
| Wesson oil (Saffola) | 40 |
| Vanilla extract | 2.5 |
| H$_2$O | 150 |
| 100 proof alcohol | 150 |

The initial viscosity of this mixture was good and excellent waffles and pancakes were produced from the formulation.

EXAMPLE III

A pancake batter was prepared in accordance with the following formulation using all powdered egg yolk without any albumen as the binding agent.

| | Grams |
|---|---|
| Pillsbury's all purpose flour (wheat) | 200 |
| Dextrose | 40 |
| Powdered egg yolk | 40 |
| Wesson oil | 40 |
| Vanilla extract | 2.5 |
| Carageenan (Gelcarin H-WG) | 3 |
| H$_2$O | 150 |
| 100 proof alcohol | 150 |

EXAMPLE IV

A pancake batter was prepared in accordance with the following formulation using only powdered egg yolk as in Example III.

| | Grams |
|---|---|
| Pillsbury's all purpose flour (wheat) | 200 |
| Dextrose | 40 |
| Powdered egg yolk | 30 |
| Wesson oil | 40 |
| Vanilla extract | 2.5 |
| Carageenan (Gelcarin H-WG) | 3 |
| H$_2$O | 150 |
| 100 proof alcohol | 150 |

The Example IV formulation makes a very stable, thinner, and non-separating batter. This formulation may be used to form a crepe. The formulation of Example III had a starting viscosity that was heavier than Example IV. The waffle made from Example III formulation was crisp and acceptable.

The powdered whole eggs used in these examples are referred to commercially as Bud, E-Z-Egg Mix and Eggstra. The Gelcarin is the source for the carageenan. The commercial name for the carageenan is Gelcarin H-WG. Carageenan is a polysaccharide and, more specifically, a salt of sulphate esters. It has been found that where the salt of sulphate esters have a ratio of sulphate to hexose units close to unity that the results in these formulations are excellent. The most utilized source for carageenan is Irish moss known technically as *Chondrus crispus* and/or *Gigartina stellata*.

It has further been discovered that sodium alginate may be used in combination with the polysaccharide such as carageenan. The combination of these ingredients has been found to establish satisfactory results with respect to shelf life and use with an aerosol dispensing system. The utilization of any polysaccharides which effectuate the desired results as characterized herein are deemed to be contemplated for use in this invention.

The above Examples I through IV were placed in a container that was impervious to alcohol vapors. A propellant gas, carbon dioxide, and an emulsifier or whipping gas, nitrous oxide, were used to eject the formulations onto a hot cooking surface.

Although it has been indicated in the prior art that the shelf life of flour containing products is improved through the use of up to 5% alcohol, it has been discovered that this prior art assumption is incorrect when considering the shelf life of liquid, ready-to-use batter mixes which are smooth-flowing and usable as pancakes, waffles or crepes. The following examples and results obtained from a bacteriological analysis confirm the discoveries of the instant invention.

EXAMPLE V

A pancake batter was prepared in accordance with the following formulation and subsequently subjected to a bacteriological analysis.

| | Grams |
|---|---|
| Pillsbury's all purpose flour (wheat) | 200 |
| Dextrose | 40 |
| Wesson oil | 40 |
| Vanilla extract | 2.5 |
| 100 proof alcohol | 150 |
| H₂O | 150 |
| Powdered egg albumen | 31 |

EXAMPLE VI

A pancake batter having the following formulation was prepared and subsequently subjected to a bacteriological analysis:

| | Grams |
|---|---|
| Pillsbury's all purpose flour (wheat) | 200 |
| Dextrose | 40 |
| Wesson oil | 40 |
| Vanilla extract | 2.5 |
| 100 proof alcohol | 61.2 |
| H₂O | 238.8 |
| Powdered egg albumen | 31 |

Samples of each of the pancake batters as set forth in Examples V and VI were analyzed as to the bacteria count present in each mixture. Analysis was made once at the beginning of a period and again re-analyzed seven days later. The following results of the analysis were discovered.

TABLE I

| Description | Alcohol content, percent | BHI broth bact./gram, total count |
|---|---|---|
| Example V | Ca. 10 | >10; <100 |
| Example VI | Ca. 5 | 20,000,000 |

The bacteriological analysis as set forth in Table I shows that ethyl alcohol must be present in quantities of substantially greater amounts than 5% to inhibit bacterial growth in the mixture of this invention at room temperature so that the mixture is suitable for human consumption. This fact is contrary to the express teaching of the prior art as exemplified by U.S. Pat. No. 3,222,189.

Various other samples of a pancake batter containing different levels of alcohol were inoculated with alcohol tolerant bacteria isolated from leaf compost enrichment to establish the criticality of the concentration of alcohol required to effectuate the desired shelf life in a liquid ready-to-mix batter preparation of this invention. The initial inoculum contained $10^6$ cells/ml. of alcohol tolerant bacteria. The inoculated tubes of batter were held at room temperature for two weeks before plate counts were made. The basic batter composition was as follows:

| | Grams |
|---|---|
| Pillsbury's all purpose flour (wheat) | 200 |
| Dextrose | 40 |
| Wesson oil | 40 |
| Vanilla extract | 2.5 |
| H₂O | 266.8 |
| Powdered egg albumen | 31 |
| Varying amounts of 190 proof alcohol. | |

TABLE II

| Alcohol concentration, percent: | Plate count at 35° C., 48 hrs. |
|---|---|
| 5 | 350,000 |
| 6 | 250,000 |
| 7 | 120,000 |
| 8 | 160,000 |
| 9 | 140,000 |
| 10 | 200 |

Again it is seen that the amount of alcohol present is required to be about 10% in order for the pancake batter of this invention to be effectively maintained for human consumption over a period of time at room temperature.

The following examples of formulations made in accordance with this invention contain effective amounts of flour, water shortening and ethyl alcohol to form a smooth flowing mixture usable as pancakes, waffles or crepes. In addition, heat coagulatable binding agents are present and have the capability of forming a texture around the flour upon the application of heat to the batter.

EXAMPLE VII

| | Grams |
|---|---|
| Pillsbury's all purpose flour | 100 |
| Dextrose | 20 |
| Wesson oil | 20 |
| Vanilla extract | 1.25 |
| Eggstra | 20 |
| 100 proof alcohol | 65.5 |
| H₂O | 65.5 |

The mixture was placed in an aerosol container and extruded therefrom onto a heated cooking surface. The texture of the cooked waffle was excellent, it was tender and had a good appearance. The amount of Eggstra was effective as a heat coagulatable binding agent which was capable of forming a texture around the flour upon the application of heat to the batter. The amount of ethyl alcohol was limited to an amount effective to prevent the precipitation of the heat coagulatable binding agent in the liquid batter mixture.

EXAMPLE VIII

| | Grams |
|---|---|
| Pillsbury's regular flour | 50 |
| Dextrose | 10 |
| Wesson oil | 10 |
| H₂O | 32.75 |
| 100 proof alcohol | 32.75 |

After the above ingredients were mixed together, 50 grams of the mixture was mixed with 5 grams of Eggstra which constituted powdered whole egg. The resultant pancake had a good texture when the formation was placed on a hot cooking surface. It has been found that where the heat coagulatable binding agent is present with alcohol, it is in an amount of at least about 3% by weight. Where the alcohol is used in combination with the heat coagulatable binding agent, it is in a range of from about 10% to 20% by weight.

Eggstra is a commercial name for a low cholesterol product formulated by Tillie Lewis Foods, Inc. An analysis of the Eggstra product is as follows:

| | |
|---|---|
| Protein | 55.5%. |
| Fat | 12.0%. |
| Carbohydrate | 21.8%. |
| Cholesterol | 572 mg./100 grams. |
| Calories | 431/100 grams. |

The Bud 26 is a product of Anheuser Busch and is referred to commercially as Egg Blend Whole Powdered Bud 26. This is a product constituting powdered whole egg.

The source for the carageenan is Gelcarin which is commercially available as Gelcarin H-WG and Viscarin 402. These products are pure carageenan. The latter commercial product is more soluble in cold water than the former. Either of these products is effective in the formulation of this invention.

With respect to the use of a leavening agent such as baking powder, it has been found that encapsulation in a shortening such as commercially available Crisco may be effective to keep it stable over a longer period of time in water. The baking powder is first creamed together with Crisco to coat it and placed in the mixture as presented in Example I hereinabove. Other encapsulating materials would include carnauba wax, stearic acid, beeswax, in addition to the hydrogenated vegetable oil which is commercially known as Crisco, or animal fats.

While the steady-to-use batter product has been shown and described in detail, it is obvious that this invention is

We claim:
1. A liquid, ready-to-use batter comprising:
  (a) effective amounts of flour, water, shortening and ethyl alcohol to form a smooth-flowing mixture usable as pancakes, waffles or crepes,
  (b) a sufficient amount of ethyl alcohol being present to inhibit bacterial growth in the mixture at room temperature so that the mixture is suitable for human consumption,
  (c) said amount of ethyl alcohol being effective to prevent an increase of viscosity of the mixture by controlling the swelling of the flour by the water.
2. The batter as defined in claim 1 wherein the ethyl alcohol is present in amounts of at least about 10% by weight.
3. The batter as defined in claim 1 wherein an effective amount of heat coagulatable binding agent is present and has the capability of forming a texture around the flour upon the application of heat to the batter, said amount of ethyl alcohol being limited to an amount effective to prevent the precipitation of the heat coagulatable binding agent in the liquid batter mixture.
4. A batter as defined in claim 3 wherein the alcohol is present in a range from about 10% to 20% by weight.
5. A batter as defined in claim 3 wherein the heat coagulatable binding agent is present in an amount of at least about 3% by weight.
6. A batter as defined in claim 3 wherein said heat coagulatable binding agent is selected from the group consisting of egg albumen, egg yolk and mixtures thereof.
7. A batter as defined in claim 1 wherein an effective amount of heat coagulatable binding agent is present and has the capability of forming a texture around the flour upon the application of heat to the batter, said amount of ethyl alcohol being limited to an amount effective to prevent the precipitation of the heat coagulatable binding agent in the liquid batter mix, and an effective amount of hydrocolloids is present to prevent the settling of the solid material in the liquid batter mixture.
8. A batter as defined in claim 7 wherein the hydrocolloids comprise carageenan.
9. A batter as defined in claim 7 wherein the hydrocolloids comprise polysaccharides.
10. A batter as defined in claim 7 wherein the hydrocolloids comprise a mixture of carageenan and sodium alginate.
11. A convenient food product comprising:
  (a) a batter mixture disposed inside a container impervious to alcohol vapor,
  (b) said batter comprising effective amounts of flour, water, shortening and ethyl alcohol to form a smooth-flowing consistency usable in pancakes, waffles or crepes, and
  (c) said ethyl alcohol being present in the batter mixture in amounts of at least about 10% by weight.
12. A food product as defined in claim 11 wherein an effective amount of heat coagulatable binding agent is present and has the capability of forming a texture around the flour upon the application of heat to the batter, said amount of ethyl alcohol being limited to an amount effective to prevent the precipitation of the heat coagulatable binding agent in the liquid batter mixture.
13. A food product as defined in claim 12 wherein the alcohol is present in a range of from about 10% to 20% by weight.
14. A food product as defined in claim 12 wherein the heat coagulatable binding agent is present in an amount of at least about 3% by weight.
15. A food product as defined in claim 11 wherein an effective amount of heat coagulatable binding agent is present and has the capability of forming a texture around the flour upon the application of heat to the batter, said amount of ethyl alcohol being limited to an amount effective to prevent the precipitation of the heat coagulatable binding agent in the liquid batter mixture, and an effective amount of hydrocolloids is present to prevent the settling of the solid material in the liquid batter mixture.
16. A food product as defined in claim 15 wherein the hydrocolloids comprise carageenan, and a pressurizing gas is disposed inside the container to propel the mixture out of the container when the product is to be cooked.
17. A food product as defined in claim 1 wherein a propellant gas and a whipping gas are disposed within the container, the propellant gas is effective to propel the mixture out of the container, and the whipping gas is effective to provide leavening to the mixture during the geress from the container onto a hot cooking surface.
18. A food product as defined in claim 17 wherein the propellant gas is carbon dioxide, and the whipping gas is nitrous oxide
19. A liquid, ready-to-use batter comprising:
  (a) effective amounts of flour, water, shortening, leaving agent and ethyl alcohol to form a smooth-flowing mixture usable in pancakes, waffles or crepes,
  (b) a sufficient amount of ethyl alcohol being present to inhibit bacterial growth in the mixture at room temperatures so that the mixture is suitable for human consumption,
  (c) said amount of ethyl alcohol being effective to prevent an increase of viscosity of the mixture by controlling the swelling of the flour by the water,
  (d) said leavening agent comprising an encapsulated baking powder which will not effectuate leavening within the mixture until heat is applied thereto when the batter is cooked.

References Cited
UNITED STATES PATENTS
3,222,189  12/1965  Perrozzi _____ 99—172
3,620,763  11/1971  Hans _____ 99—189

RAYMOND N. JONES, Primary Examiner

U.S. Cl. X.R.
426—151, 155